(12) United States Patent
Palmer (10) Patent No.: US 6,213,450 B1
(45) Date of Patent: Apr. 10, 2001

(54) VALVES

(75) Inventor: Thomas Palmer, Kimberley (GB)

(73) Assignee: Hygienic Pigging Systems Limited (GB)

( * ) Notice: Subject to any disclaimer, the term of this patent is extended or adjusted under 35 U.S.C. 154(b) by 0 days.

(21) Appl. No.: 09/393,912

(22) Filed: Sep. 10, 1999

(30) Foreign Application Priority Data

Dec. 9, 1998 (GB) .................................................. 9819835

(51) Int. Cl.[7] ................................. F17D 3/00; F16K 3/36; F16K 25/00
(52) U.S. Cl. ....................... 251/170; 251/172; 137/15.06; 137/239
(58) Field of Search ........................ 137/15, 240, 15.05, 137/15.06, 239; 251/170, 172

(56) References Cited

U.S. PATENT DOCUMENTS

| | | | |
|---|---|---|---|
| 3,605,789 | * 9/1971 | Graham | 137/240 |
| 4,140,147 | * 2/1979 | Van't Sant | 137/240 |
| 4,163,458 | * 8/1979 | Bachmann | 137/240 |
| 4,292,992 | * 10/1981 | Bhide' | 137/240 |
| 4,561,472 | * 12/1985 | Dreyer et al. | 137/240 |
| 4,664,139 | * 5/1987 | Pfeiffer | 137/240 |
| 5,246,041 | * 9/1993 | Wiese | 137/240 |
| 5,934,311 | * 8/1999 | Brown | 137/240 |
| 6,089,255 | * 7/2000 | Bonnefous et al. | 137/240 |

* cited by examiner

Primary Examiner—Kevin Shaver
Assistant Examiner—David A. Bonderer
(74) Attorney, Agent, or Firm—Watts, Hoffman, Fisher & Heinke Co LPA (57) ABSTRACT

The invention provides a valve 10,30 for connecting first and second conduits 12,14. The valve 10,30 comprises; a valve member 16 rotatably mounted in a housing 18, to define a space 22 between the valve member 16 and the housing 18; and inflatable seal means 20,32, operable to provide a seal between the valve member 16 and the housing 18. The invention further provides a valve assembly 40 for connecting first and second conduits 12,14. The assembly 40 comprises: a valve member 16 movably mounted in a housing 18, to define a space 22 between the valve member 16 and the housing 18; inflatable seal means 20,32, operable to provide a seal between the valve member 16 and the housing 18; and an air inlet controller 42 for supplying compressed air into the space 22, for driving a pig 44 along the conduits 12,14. The invention also provides methods of cleaning the valve 10,30 and assembly 40 in situ by in-line fluid flow.

20 Claims, 12 Drawing Sheets

VALVES

The invention relates to valves, particularly but not exclusively valves for connecting conduits.

In certain manufacturing industries, such as the food industry and the cosmetics industry, it is a requirement that the manufacturing tanks and conduits are cleaned to a high standard of hygiene between production of different products. The conduits are often connected by a valve for providing selective communication between two conduits. One known type of valve comprises a ball located within a housing connectable between conduits, the ball having a passage provided therethrough which allows for selective connection of the conduits by rotation of the ball to align the passage with the conduits or remove It from alignment to cut off connection. The valve must cleanable to a high standard of hygiene.

The cleaning of conduits in manufacturing plant is often effected by piping cleaning fluid through the tanks, conduits and valves, using a pigging system Conventional valves suitable for use in a pigging system cannot be cleaned to a sufficiently high level of hygiene for use in the aforementioned industries.

According to one aspect of the present invention there is provided a valve for connecting first and second conduits, the valve comprising a valve member movably mounted in a housing, to define a space between the valve member and the housing, the valve member being movable between an open condition in which fluid can flow through the valve and a closed condition in which fluid is substantially prevented from flowing through the valve, and releasable seal means operable to provide a seal between the valve member and the housing when the valve member is in the closed condition, and whereby the releasable seal means can be released when the valve member is in the open condition to allow fluid to flow through said space.

The seal is preferably provided between the valve member and the interior of the housing.

The valve member preferably defines a connecting passage which provides for the flow of fluid through the valve. The passage may at least partially align with the first and second conduits when in the open condition, to thereby provide communication for the flow of fluid through the valve.

The open condition desirably comprises a fully open condition in which the passage is fully aligned with the first and second conduits, and/or an intermediate, partially open condition substantially intermediate the fully open condition and the closed condition. The intermediate condition is preferably at substantially 45 degrees from the fully open condition. Desirably, the valve member is not fully aligned with either of the first or second conduits when in the intermediate condition, but off-set to provide for communication with the interior of the housing, to thereby permit the flow of fluid through the space between the valve member and the housing. The fluid may be cleaning fluid.

The valve member is preferably rotatable within the housing. Desirably, the valve member is rotatable about its central longitudinal axis. The valve member is preferably mounted on and supported by an opposing pair of pin means, such that the central longitudinal axis of the valve member is coaxial with a line through the pin means. The valve member is desirably of substantially circular section perpendicular to the central longitudinal axis of the valve member. The valve member may be of substantially spherical configuration.

Preferably, the interior of the housing is of a complementary shape to the valve member, such that the housing closely fits the valve member.

The releasable seal means is preferably an inflatable seal means, having an inflated condition and a deflated condition, which may be selectively inflated to seal the space between the valve member and the housing, thereby preventing flow of fluid through the space. The inflatable seal means may be a rubber seal means inflatable by a gas, such as air. A gas inlet is preferably provided in communication with the inflatable seal means for supplying gas to the seal means. The inflatable seal means may comprise a silicone joint and a pneumatic ring. The seal means is preferably of annular shape, and is desirably circular. The seal means is desirably at least partially set into the internal wall of the housing. The seal means is preferably located in the internal wall of the housing such that it is arranged generally around the passage through the valve member, preferably towards one end thereof.

Two seal means may be provided, preferably one towards each end of the passage through the valve member. Preferably each seal means is independently inflatable.

A drain means is preferably provided within the housing for enabling fluid to be drained from the interior of the housing. The drain means preferably has an open condition in which fluid may pass therethrough.

The drain means may additionally have a closed condition in which fluid is prevented from passing therethrough. The drain means is preferably in the closed condition when the valve member is in the open condition. The drain means is preferably in the open condition when the valve means is in the closed condition.

One or each seal means may be in the inflated condition or may be in the deflated condition when the valve member is in the open condition. One or each seal means may be in the inflated condition or may be in the deflated condition when the valve member is In the closed condition The or each seal means are preferably in the deflated condition when the valve member is in the intermediate condition.

According to another aspect of the invention, there is provided a method of cleaning a valve, the valve being according to any of paragraphs 4 to 13, the method comprising releasing the releasable seal means, moving the valve member to the open condition, and supplying fluid to the valve from one of the first and second conduits, the fluid flowing through the passage and the space to the other of the first and second conduits.

According to another aspect of the invention there is provided a method of cleaning a valve, the valve being according to paragraphs 11 or 13, the method comprising moving the valve member to the dosed condition, deflating the or at least one inflatable seal means, and supplying fluid to the valve from one of the first and second conduits, the fluid flowing through the space and the passage.

When there are two inflatable seal means, preferably both inflatable seal means are deflated.

The method preferably further comprises flipping the valve member from the closed condition to the open condition, and preferably back again. while cleaning fluid is flowing through the valve, to assist the flow of cleaning fluid over substantially the whole surface of the valve member.

According to another aspect of the invention there is provided a method of cleaning a valve, the valve being according to paragraphs 12 or 13, the method comprising deflating the or each inflatable seal means and supplying fluid to the valve from one of the first and second conduits, the fluid flowing through the space and the passage. The valve member may be in the open condition or in the closed condition The method preferably further comprises flipping the valve member from one of the open condition and the closed condition to the other of the open condition and the closed condition, and preferably back again, while cleaning fluid is flowing through the valve, to assist the flow of cleaning fluid over substantially the whole surface of the valve member.

A further aspect of the present invention provides a valve assembly for connecting first and second conduits, the assembly comprising a valve member movably mounted in a housing, to define a space between the valve member and the housing, the valve member being movable between an open condition in which fluid can flow through the valve assembly and a closed condition in which fluid is substantially prevented from flowing from the first or second conduits through the valve assembly, releasable seal means operable to provide a seal between the valve member and the housing when the valve member is in the closed condition, and whereby the releasable seal means can be released when the valve member is in the open condition to allow a first fluid to flow through the valve assembly via said space, and inlet means for a second fluid, the inlet means being in communication with the space between the valve member and the housing for supplying said second fluid to said space.

The second fluid is preferably gas, and is most preferably air. The gas may be at a pressure greater than atmospheric pressure. The inlet means desirably has an open condition in which the inlet is communicatively connected to the space and a closed condition in which the inlet is cut off from the space. The inlet means preferably comprises control means and a conduit for passing the gas from the control means to the valve assembly.

The valve member, housing and releasable seal means are generally as previously described, with the following modifications.

The passage defined by the valve member is preferably communicatively connected to the space between the valve member and the housing when the valve is in the closed condition. Preferably, a first seal means is in the inflated condition when the valve member is in the closed condition, to thereby seal a first side of the valve assembly; the second fluid can then be supplied to said space, and passed through the valve assembly to one of the first and second conduits. Alternatively, a second seal means may be in the inflated condition, to thereby seal a second side of the valve assembly; the second fluid can then be supplied to said space, and passed through the valve assembly to the other of the first and second conduits.

The valve assembly is preferably for use in a pigging system, the pigging system comprising a conduit cleaning device, often termed a pig. The conduit cleaning device is desirably of a shape and size suitable for being accepted by and passed through the passage. Preferably, when said conduit cleaning device is located in the first conduit and adjacent the valve assembly, the valve member is in the closed condition and the seal means provided toward the second conduit is in the inflated condition, thereby sealing the valve assembly from the second conduit, fluid passed from the inlet means to the first conduit via the space and the passage acts on the conduit cleaning device, thereby urging the device along the first conduit.

Alternatively, when said conduit cleaning device is located in the second conduit and adjacent the valve assembly, the valve member is in the closed condition and the seal means provided toward the first conduit is in the inflated condition, thereby sealing the valve apparatus from the first conduit, fluid passed from the inlet means to the second conduit via the space and the passage acts on the conduit cleaning device, thereby pushing the device along the second conduit.

A further aspect of the invention provides a method of urging a conduit cleaning device along a conduit connected to a valve assembly according to any of paragraphs 13 to 18, the method comprising moving the valve member to the closed condition, sealing the releasable seal means, and passing fluid to the space through the fluid inlet means, the fluid acting on the conduit cleaning device and thereby urging the device along the conduit.

Embodiments of the invention will now be described in more detail, by way of example only, with reference to the accompanying drawings, in which.

Referring to FIGS. 1 to 4, there is provided a valve 10 for connecting first and second conduits 12,14 respectively, The valve 10 comprises a valve member 16 movably mounted in a housing 18, to define a space 22 between the valve member 16 and the housing 18. The valve member 16 is movable between an open condition (FIGS. 1 and 2) in which fluid (not shown) can flow through the valve 10, and a closed condition (FIG. 3) in which fluid is substantially prevented from flowing through the valve 10. A releasable seal means is provided, in the form of an inflatable seal 20, operable to provide a seal between the valve member 16 and the housing 18 when the valve member 16 is in the closed condition. The seal 20 can be released when the valve member 16 is in the open condition to allow fluid to flow through the valve 10, via the space 22.

The valve member 16 is substantially spherical, and has a passage 24 provided through the middle of the valve member 16, through which fluid can flow from the first conduit 12 to the second conduit 14, and vice versa. The valve member 16 is mounted on pins 26, 28 on which the valve member 16 can rotate within the housing 18.

The interior of the housing 18 is of a complementary spherical shape, such that the housing 18 closely fits around the valve member 16.

The inflatable seal 20 can be selectively inflated to seal the space 22 between the valve member 16 and the interior of the housing 18. The seal 20 comprises a partially hollow circular rubber ring, inflated by pumping air into the ring, via air inlet 21. The seal 20 is set into the internal wall of the housing 18, such that movement of the valve member 16 is not obstructed when the seal 20 is deflated. When the seal 20 is inflated with air, the seal 20 extends into the space 22 between the valve member 16 and the housing 18. The seal 20 is provided within the internal wall of the housing 18, arranged such that the seal 20 is located generally around one end of the passage 24 through the valve member 16.

Figure 1:
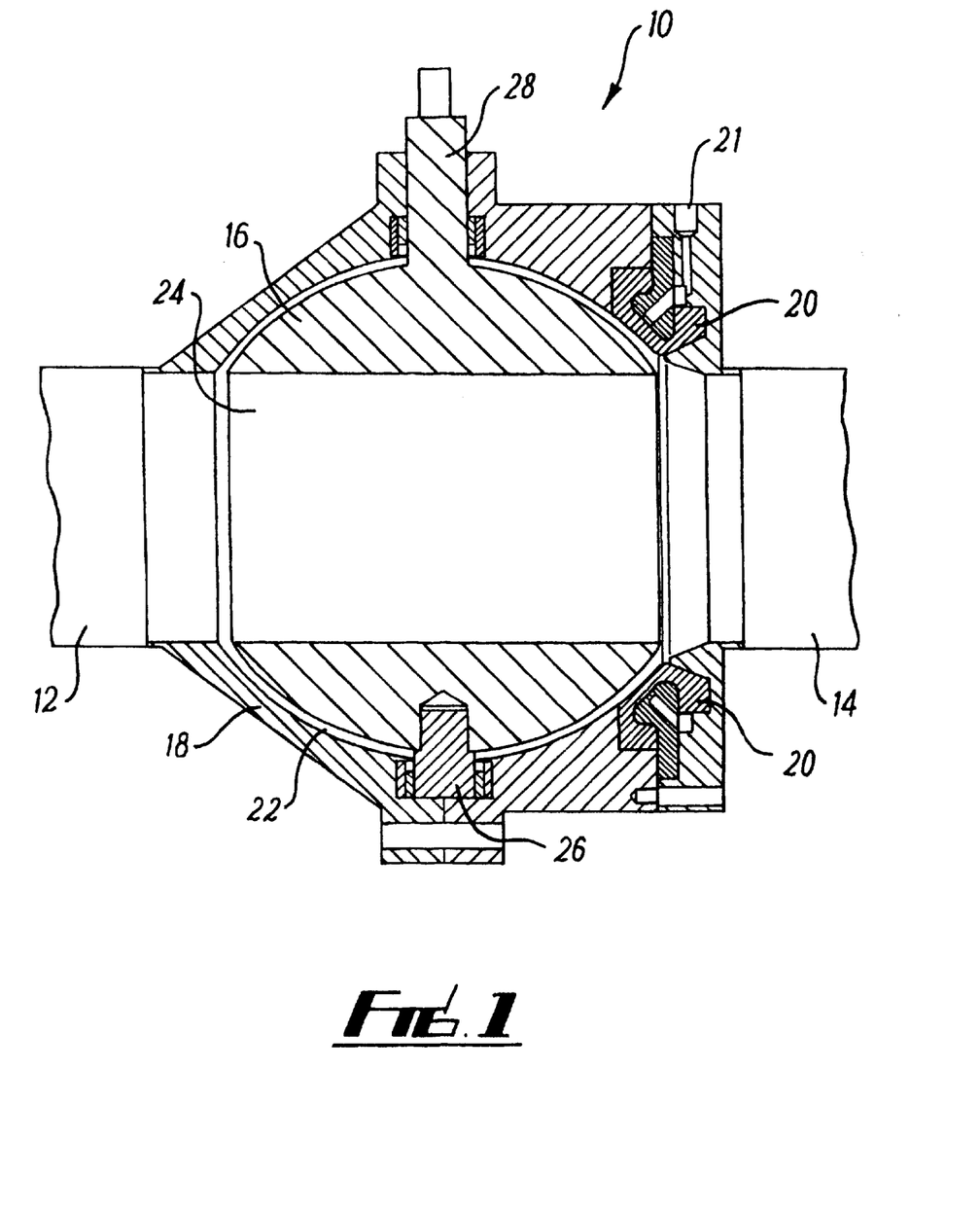
FIG. 1 is diagrammatic sectional plan view of a valve according to the invention.
Figure 2:
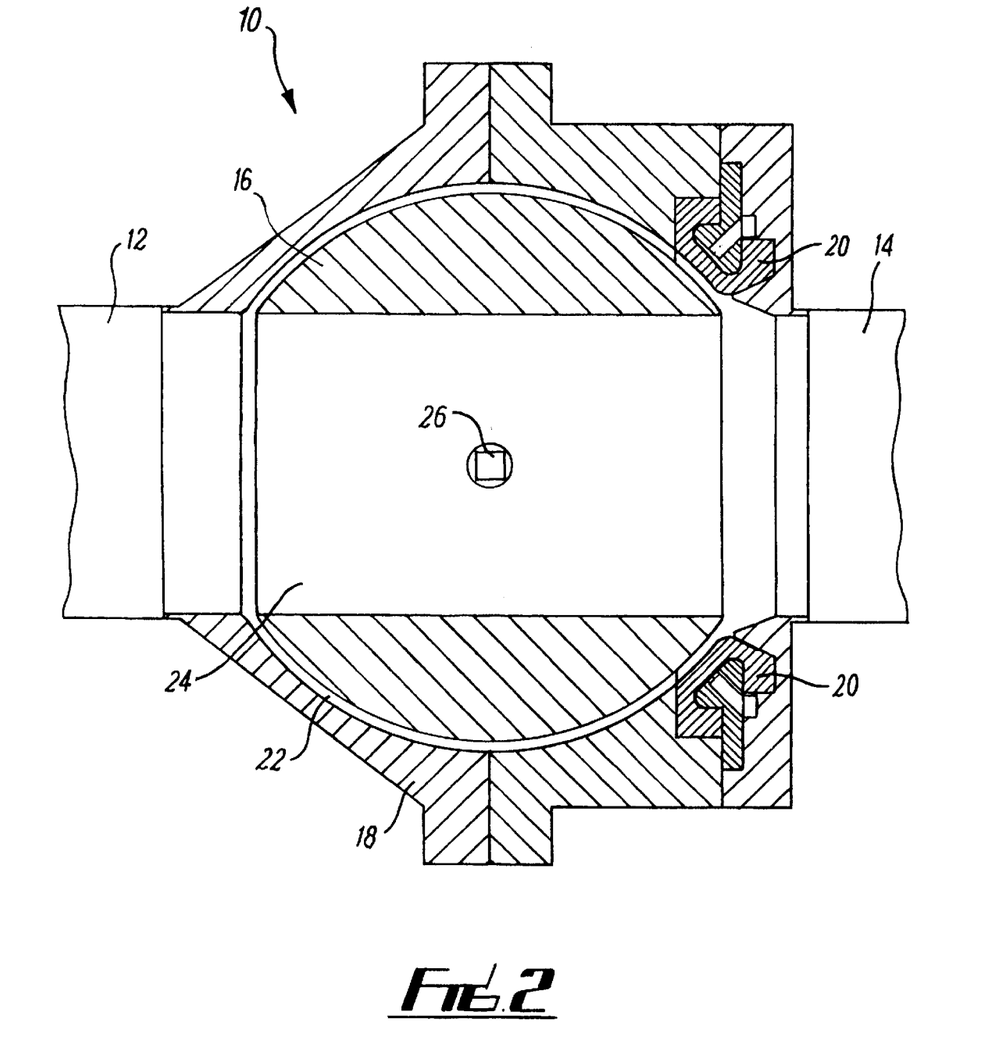
FIG. 2 is a diagrammatic sectional side view of the valve of FIG. 1 in the open condition.
Figure 3:
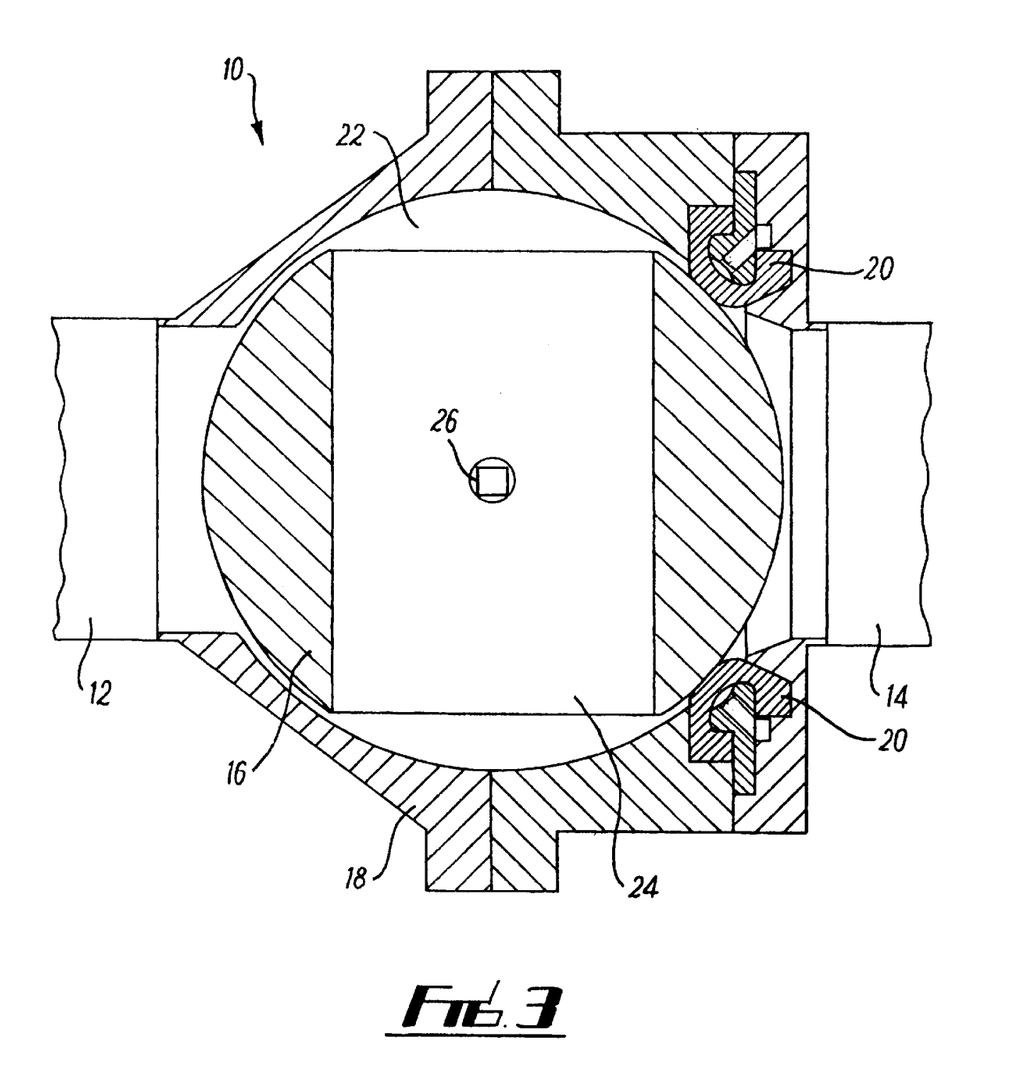
FIG. 3 is a diagrammatic sectional side view of the valve of FIG. 1 in the closed condition.

When the valve member 16 is in the fully open condition, fluid can flow from the first conduit 12 to the second conduit 14, and vice versa, through the passage 24 in the valve member 16. The seal 20 may be in the inflated or deflated condition. When the valve member 16 is in the closed condition, connection between the conduits 12, 14 is cut off. The seal 20 is inflated, thereby sealing the space 22 between the valve member 16 and the housing 18, and preventing fluid flow between the conduits 12, 14, through the space 22.

Figure 4:
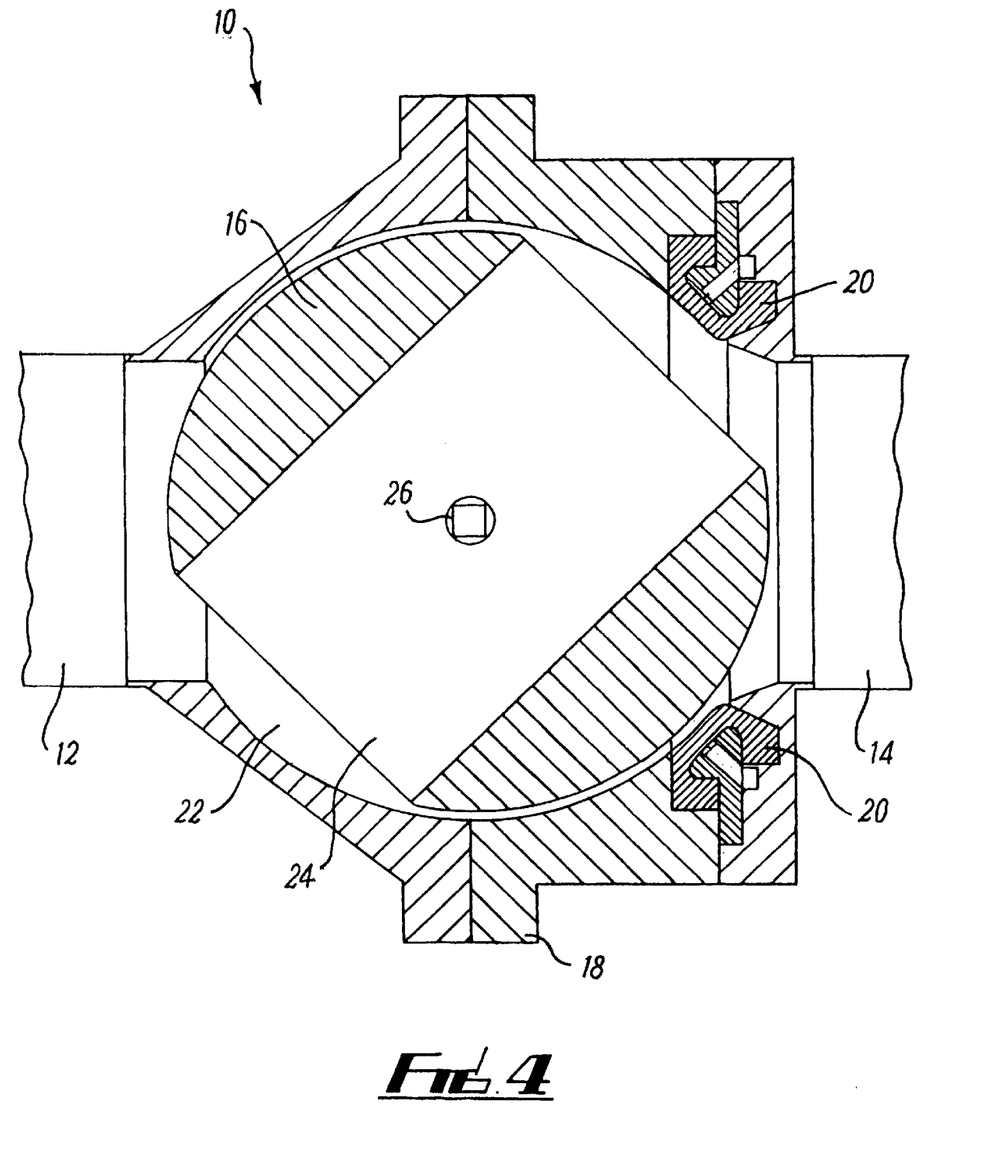
FIG. 4 is a diagrammatic sectional side view of the valve of FIG. 1 in the intermediate condition.

If cleaning of the valve 10 is desired, the valve member 16 is rotated to an intermediate, partially open condition as shown in FIG. 4, the valve member 16 assuming a position intermediate its position In the open and closed conditions. The valve member 16 is oriented such that fluid flow is permitted between the conduits 12, 14 both through the passage 24 and through the space 22. The seal 20 is deflated to allow free rotation of the valve member 16 and flow of fluid through the space 22. Both the interior and the exterior of the valve member 16, and the interior of the housing 18 can thus be cleaned by passing cleaning fluid through the valve 10.

The valve 10 can therefore be cleaned in situ by in-line fluid flow, to achieve the high standard of hygiene required in industries such as the food industry and the cosmetics industry.

Figure 5:
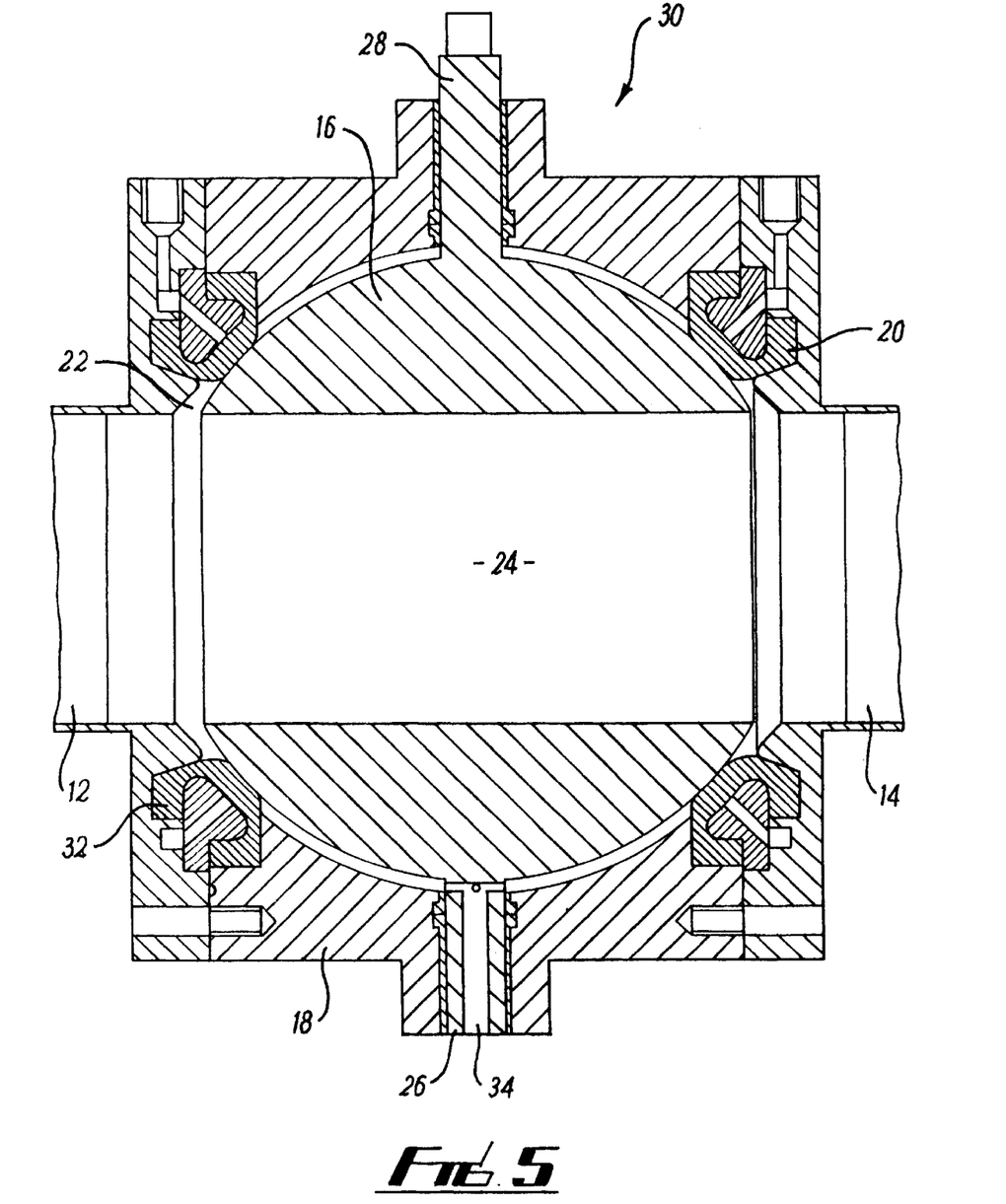
FIG. 5 is a diagrammatic sectional plan view of an alternative valve according to the invention in the open condition.
Figure 6:
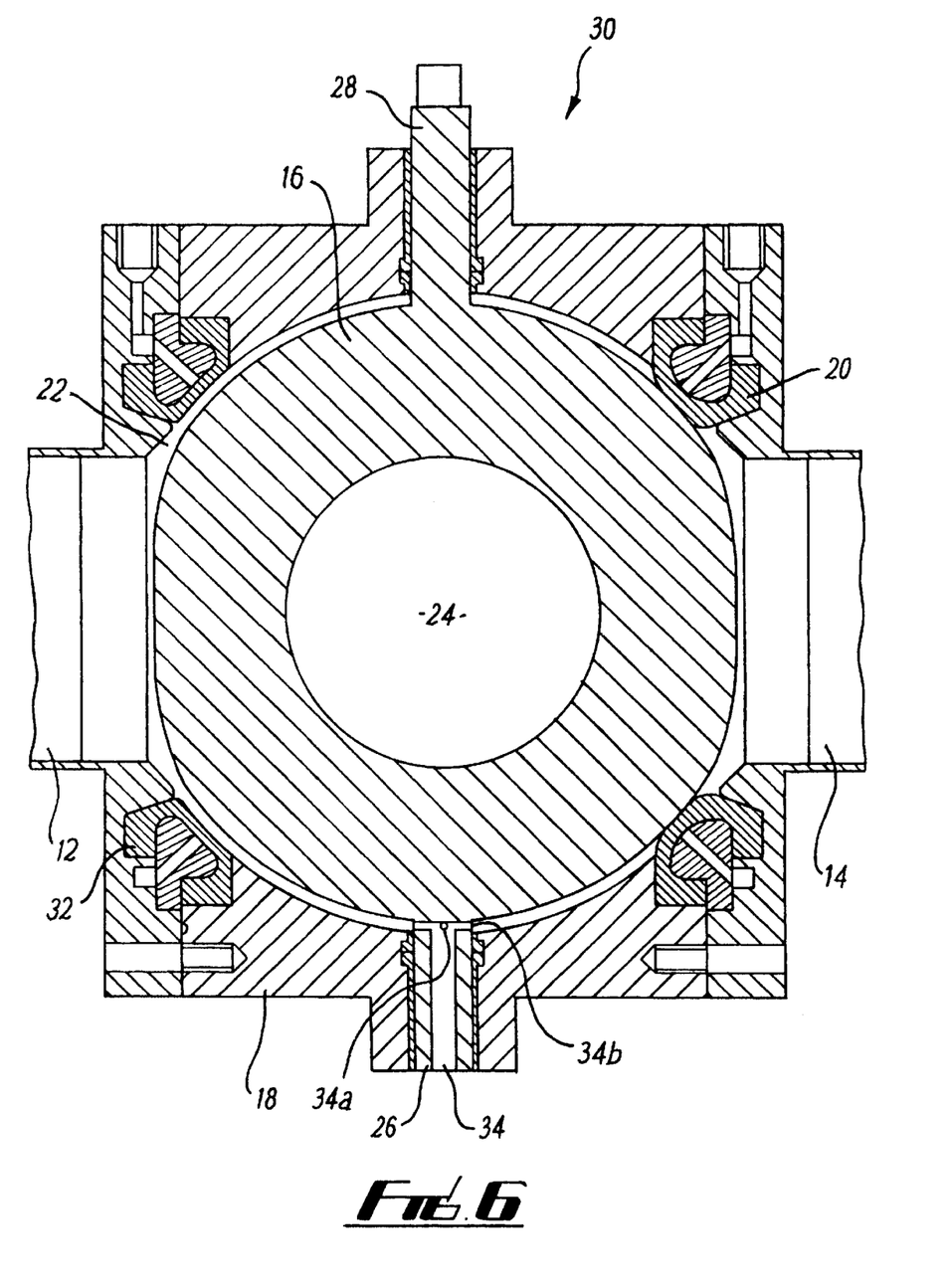
FIG. 6 is a diagrammatic sectional plan view of the valve of Figure S in the closed condition.
Figure 7:
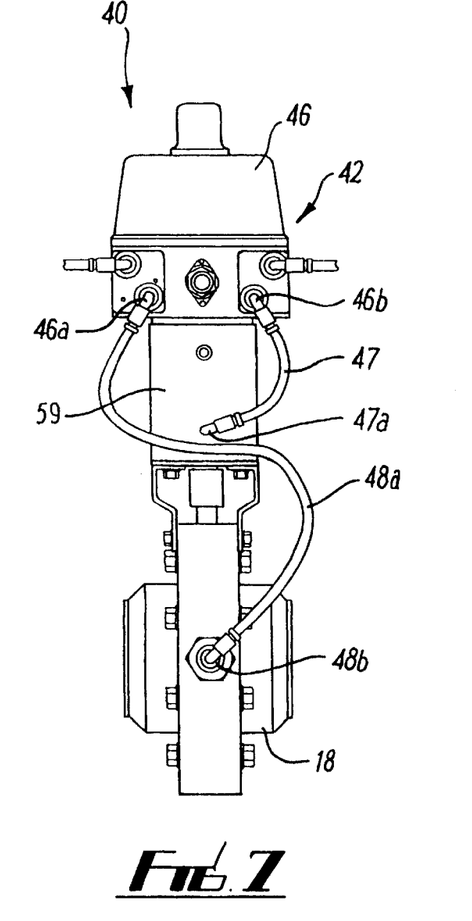
FIG. 7 is a diagrammatic side view of a valve assembly according to a second aspect of the invention.
Figure 8:
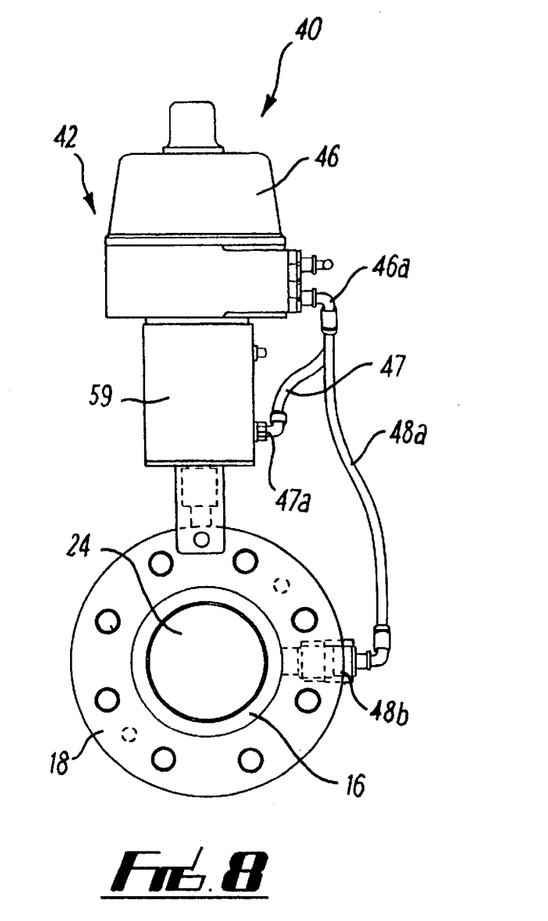
FIG. 8 is a diagrammatic front view of the valve assembly of FIG. 5.
Figure 9:
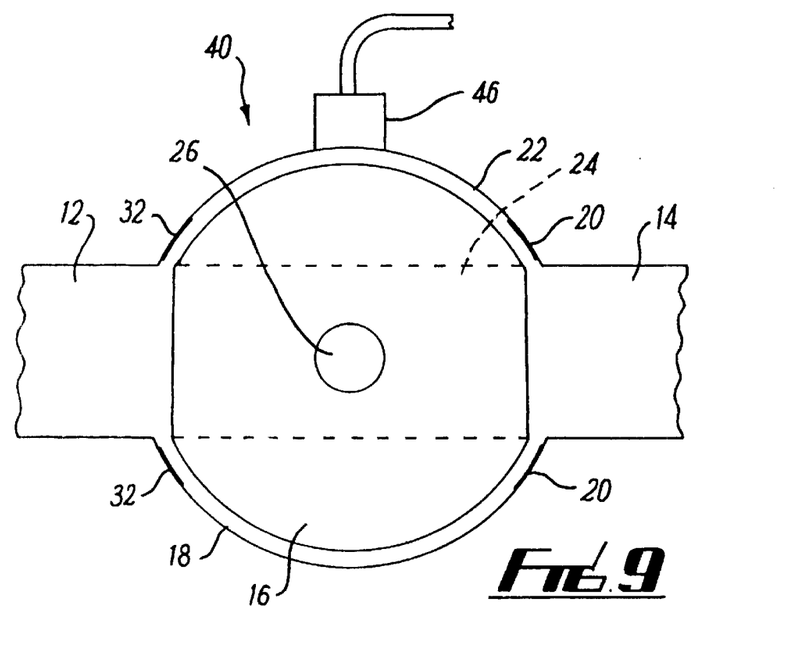
FIG. 9 is a diagrammatic side view of the valve assembly of FIG. 7 in the open condition.
Figure 10:
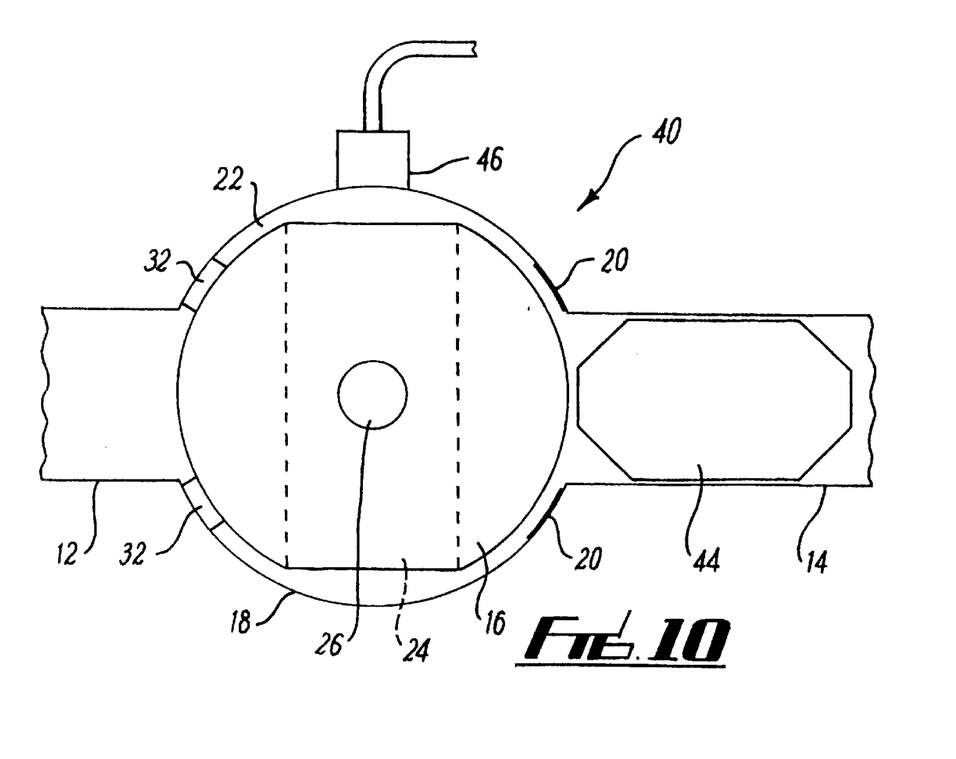
FIG. 10 is a diagrammatic side view of the valve assembly of FIG. 7 in the closed condition.
Figure 11:
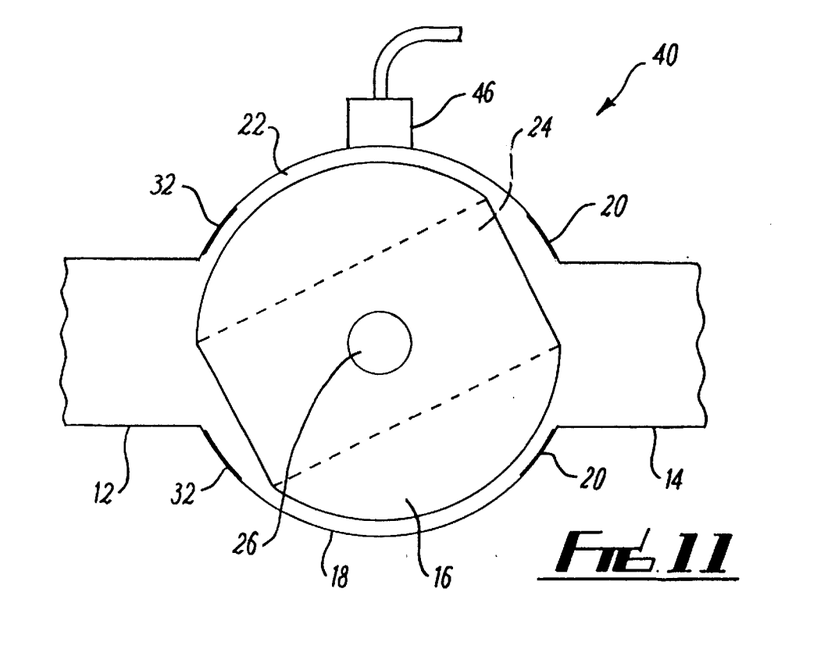
FIG. 11 is a diagrammatic side view of the valve assembly of FIG. 7 in the intermediate condition.

A second embodiment of the invention is shown in FIGS. 5 and 6, the same numbering is retained for corresponding features. The valve 30 is generally as described above, with the following modifications.

In this embodiment, a second inflatable seal 32 is provided, set into the internal wall of the housing 18 as above, arranged such that the second seal 32 is located generally around the other end of the passage 24 through the valve member 16. Two seals 20,32 are thus provided, one towards each end of the passage 24. The seals 20,32 are independently actuable.

A drain 34 is provided within the pin 26 to allow fluid to drain out of the space 22, to the exterior of the housing 18. The drain 34 is in communication with the space 22 via two drain conduits 34a,34b.

When the valve member 16 is in the fully open condition, as shown in FIG. 5, fluid can flow from the first conduit 12 to the second conduit 14, and vice versa, through the passage 24 in the valve member 16. The seals 20, 32 are in the inflated condition, to prevent any fluid from flowing through the drain 34. When the valve member 16 is in the closed condition, as shown in FIG. 6, connection between the conduits 12, 14 is cut off. The space 22 between the valve member 16 and the housing 18 is sealed by inflating the seals 20,32, thereby preventing fluid flow between the conduits 12,14, via the space 22.

When both seals 20,32 are inflated the valve 30 has a double seal Should one seal 20,32 leak, allowing fluid into the space 22, the fluid will flow through the drain 34. In this way a first product in the first conduit 12 will be kept isolated from a second product, or a cleaning fluid, in the second conduit 14 even when one seal 20,32 on the valve 30 fails. Any leaked fluid is removed from the valve 30 through the drain 34, thereby preventing the leaked fluid from pressurising the other seal 20,32.

If cleaning of the valve 30 is desired, this may be achieved, in addition to the above mentioned method of cleaning the valve apparatus 10 of the first embodiment, as follows. The valve member 16 is rotated to the closed condition and the seals 29,32 are deflated. Cleaning fluid is passed through the valve 30, from the first conduit 12 to the second conduit 14, or vice verse The cleaning fluid flows through the passage 24 and the space 22, with some flowing out of the space 22 through the drain 34. While cleaning fluid is flowing through the valve 30, the valve member 16 is flipped from the closed condition to the open condition, and back again, to ensure that the cleaning fluid flows over the whole surface of the valve member 16.

Alternatively, the valve 30 may be cleaned by rotating the valve member 16 to the closed condition, inflating one seal 20 and deflating the other seal 32, as shown in FIG. 6. Cleaning fluid may then flow into the valve 30 from the first conduit 12, through the space 22 and passage 24, and out of the drain 34 or the first conduit 12. The valve 30 can thus be cleaned in situ without removing product from the second conduit 14.

Both the interior and the exterior of the valve member 16, and the interior of the housing 18 can thus be cleaned by cleaning fluid flowing through the valve, A further embodiment of the invention is shown in FIGS. 7 to 11, the same numbering is retained for corresponding features, in which there is provided a valve assembly 40 for connecting first and second conduits 12,14. The assembly 40 comprises a valve member 16 movably mounted in a housing 18, to define a space 22 between the valve member 16 and the housing 18. The valve member is movable between an open condition in which a first fluid (not shown) can flow through the assembly 40, and a second condition in which said fluid is substantially prevented from flowing from the first or second conduits 12,14 through the valve assembly 40. A releasable seal means is provided, in the form of inflatable seals 20,32, operable to provide a seal between the valve member 16 and the housing 18 when the valve member 16 is in the dosed condition. The seals 20,32 can be released when the valve member 16 is in the open condition to allow said fluid to flow through the assembly 40. An air inlet controller 42 is provided for supplying a second fluid, in the form of compressed air, into the space 22 for driving a pig 44 along the conduits 12,14 as will be explained below, and for effecting rotation of the valve member, as will also be explained below.

The valve member 16, housing 18 and inflatable seals 20,32 are generally as described above, with the following modifications.

The air inlet controller 42 comprises a housing 46, a conduit 48a, connected between an outlet 46a provided on the housing 46 and an inlet 48b provided on the valve assembly housing 18, and a conduit 47, connected between an outlet 46b and an inlet 47a in a cyclinder 59. The cylinder 59 houses a spring and piston arrangement (not shown) connected by appropriate gearing to the valve member 16. The supply of compressed air into the cylinder 59 moves the piston against the force of the spring and causes the valve member to move from the open condition to the closed condition. When the supply of compressed air is shut off the force of the spring moves the piston back to its original position, thereby moving the valve member 16 to the open condition. Hence the valve member 16 is retained in its open condition by the action of the spring. The controller 42 is actuated by a solenoid.

A second air inlet controller (not shown) is provided for supplying air to the inflatable seal means 20,32.

Figure 12:
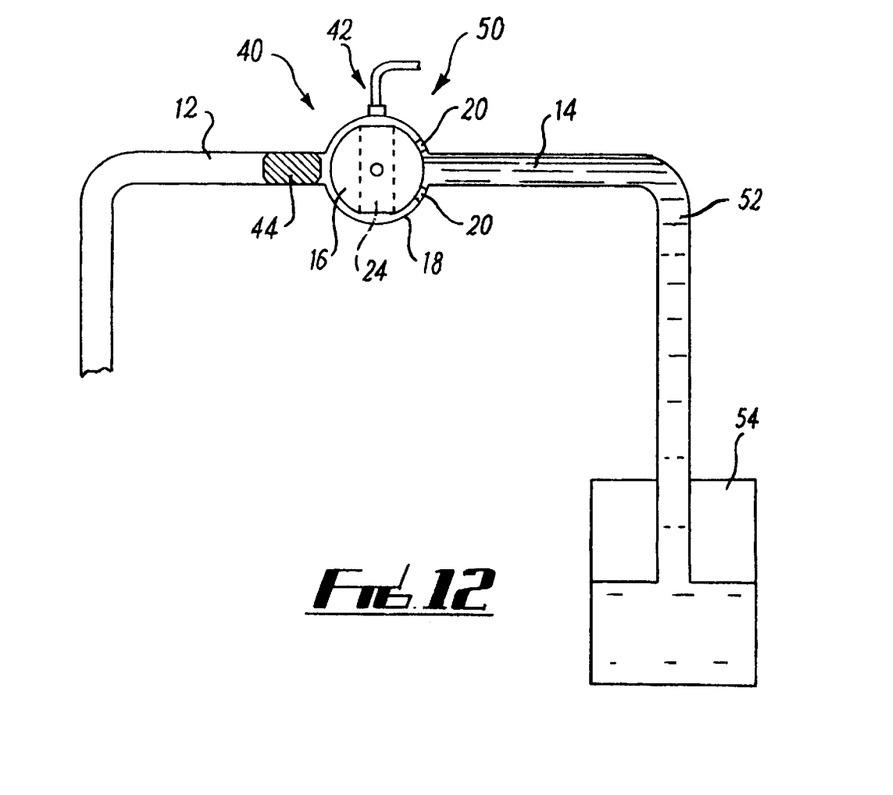
FIG. 12 is a schematic representation of part of a pigging system comprising a valve assembly according to the invention.

The valve assembly 40 may be used in a pigging system 50, as shown in FIG. 12, in which a pig 44 is used to assist in cleaning the conduits 12, 14 in a manufacturing plant. The pig 44 is of a shape and size suitable for passing through the conduits 12, 14 and the passage 24 in the valve member 16. When the end of a batch of product fluid 52 has passed through the valve assembly 40, to a storage tank 54, the valve member 16 is rotated to the closed condition Some fluid 52 may remain in the second conduit 14 after the valve member 16 is closed. The pig 44 is thus located in the first conduit 12, adjacent the valve apparatus 40.

To return the pig 44 along the first conduit 12, the seal 20 is inflated to seal off the valve assembly 40 from the second conduit 14. Air is then supplied to the housing 18 through conduit 48a, and passes through the passage 24 and space 22 to the first conduit 12. The air acts on the pig 44 thereby urging the pig 44 along the first conduit 12, to a desired location.

Alternatively, when the pig 44 is located in the second conduit 14, the second seal 32 can be inflated, to seal the second side of the valve assembly 40. Air supplied to the housing 18 will thus be passed to the second conduit 14 and urge the pig 44 along the second conduit 14.

It will be appreciated that the valve assembly 40 may also be cleaned in the same manner as valves 10 and 30.

Figure 13:
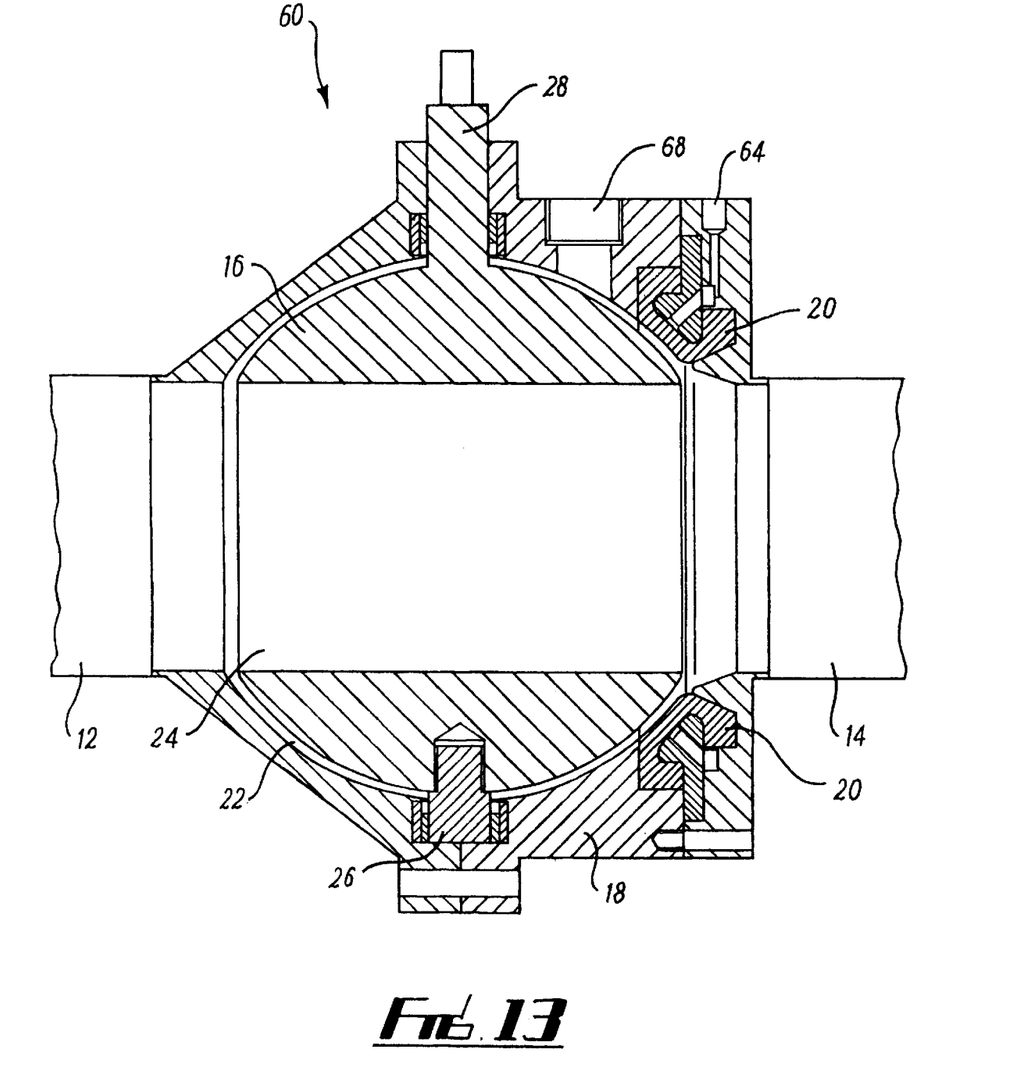
FIG. 13 is a diagrammatic sectional plan view of a valve assembly according to a further aspect of the invention.
Figure 14:
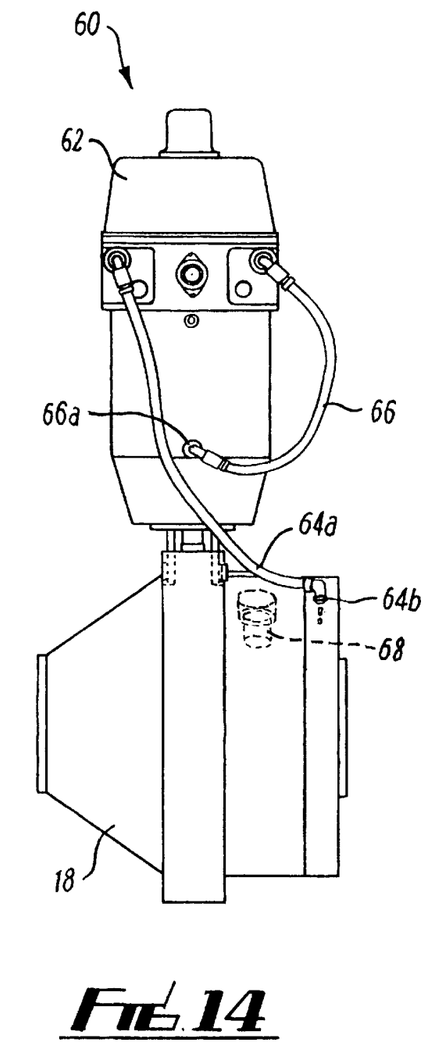
FIG. 14 is a diagrammatic side view of the valve assembly of FIG. 13.
Figure 15:
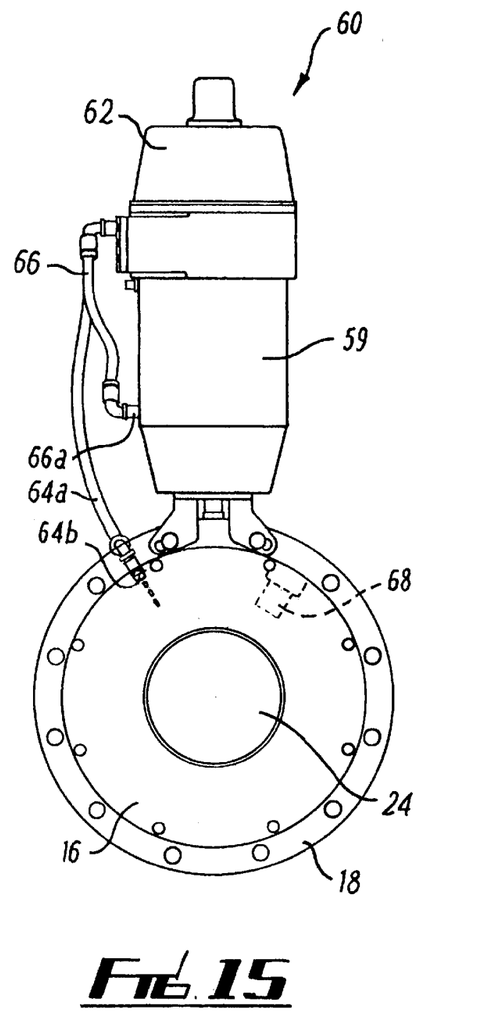
FIG. 15 is a diagrammatic front view of the valve assembly of FIG. 13.

A further embodiment of the invention is shown in FIGS. 13 to 15, the same numbering is retained for corresponding features. This embodiment provides a valve assembly 60 for connecting first and second conduits 12,14. The valve assembly comprises a valve member 16, housing 18 and inflatable seal 20 generally as described in the first embodiment, shown in FIGS. 1 to 4, with the following modifications.

Rotation of the valve member 16 and inflation of the seal 20 are operated by means of compressed air. A first compressed air inlet controller 62 is provided for controlling the supply of compressed air to the seal 20, via conduit 64a and inlet 64b, for inflating the seal 20, and for controlling the supply of compressed air via conduit 66 and inlet 66a for effecting rotation of the valve member 16. The controller 62 is actuated by a solenoid.

The valve assembly 60 may be used in a pigging system 50, such as that shown in FIG. 12, in which a pig device 44 is used to assist in cleaning the conduits 12,14. The pigging system 50 is generally as described above, with the following modifications.

When the end of a batch of product fluid 52 has passed through the valve assembly 60, to a storage tank 54, the valve member 16 is rotated to the closed condition by supplying air into the cylinder 59, housing the piston and spring arrangement, as described above, via conduit 66. The rotation of the valve member 16 is thereby controlled by the supply of compressed air into the cylinder 59 in the same way as described above with respect to FIGS. 7 and 8.

Movement of the pig along a conduit 12,14 is effected by means of compressed air. A second compressed air controller (not shown) is provided for controlling the supply of a second fluid, such as compressed air, into the space 22, via a fluid inlet 68.

To return the pig 44 along the first conduit 12, the seal 20 is inflated, via conduit 64a, to seal off the valve assembly 60 from the second conduit 14. Air is then supplied to the space 22 through the fluid inlet 68. The air passes through the space 22 and passage 24 to the first conduit 12, where the air acts on the pig 44, thereby urging the pig 44 along the first conduit 12 to a desired location.

It will be appreciated that a seal 32 may alternatively, or additionally, be provided on the other side of the valve member 16, generally around the first conduit 12, thereby allowing a pig 44 located within the second conduit 14 to be similarly urged along said second conduit 14. It will also be appreciated that the valve assembly 60 may be cleaned in the same manner as the valves 10 and 30.

Figure 16:
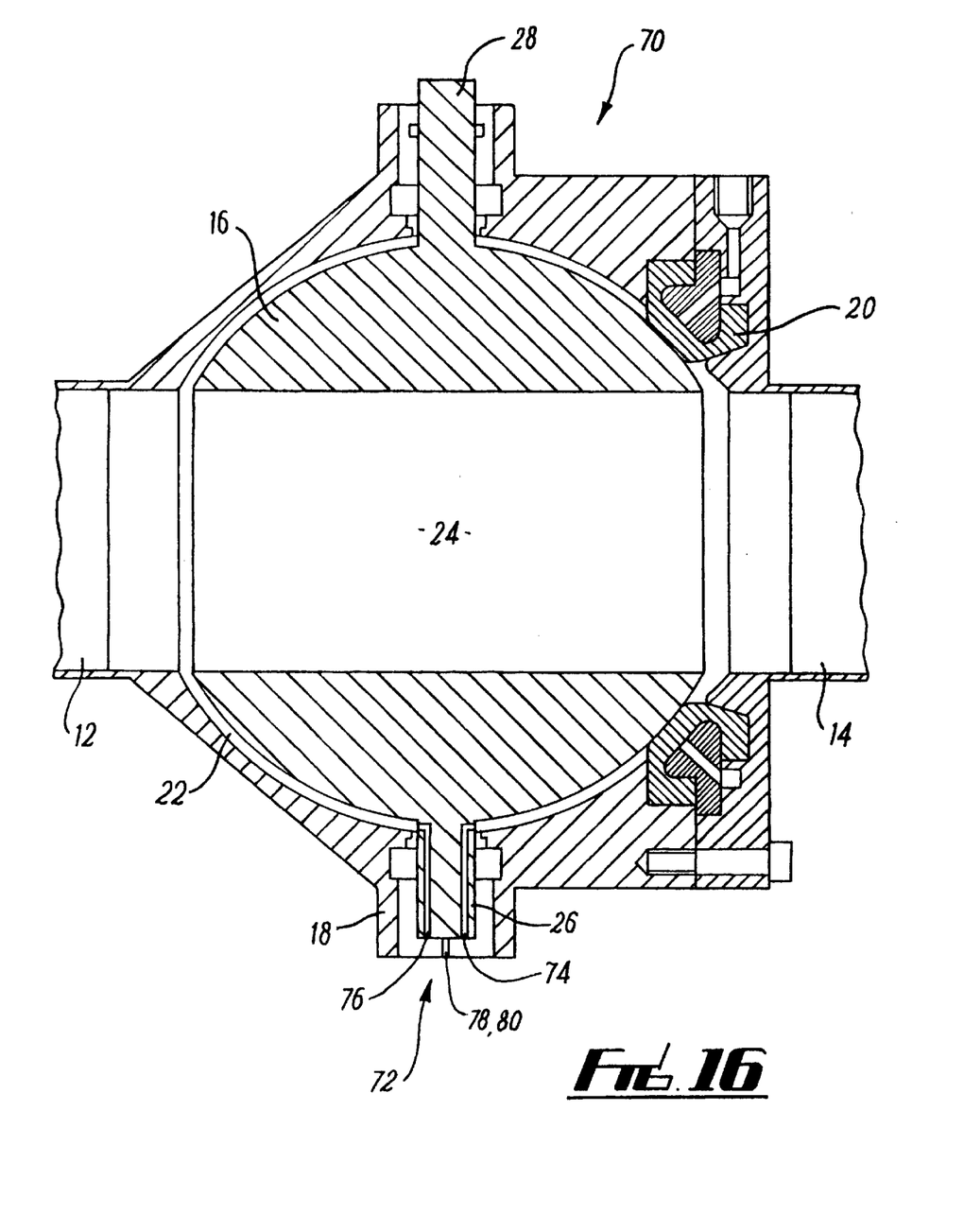
FIG. 16 is a diagrammatic sectional side view of an alternative valve according to the present invention.

A further embodiment of the invention is shown in FIG. 16, the same numbering is retained for corresponding features. This embodiment provides a valve 70 for connecting first and second conduits 12,14. The valve 70 is generally as described in the first embodiment, FIGS. 1 to 4, with the following modifications.

In this embodiment, a drain 72 is provided, to enable fluid to be drained out of the space 22. The drain 72 has a closed condition, as shown in FIG. 16, in which fluid is prevented from flowing through the drain 17, and an open condition (not shown) in which fluid may flow through the drain 72.

The drain 72 comprises four drain conduits 74,76,78,80. A first set of drain conduits 74,76 are provided in the pin 26. A second set of drain conduits 78,80 are provided in the housing 18. When the valve 70 is in the open condition, as shown in FIG. 16, the first set of drain conduits 74,76 are out of alignment with the second set of drain conduits 78,80, hence fluid cannot flow from the first drain conduits 74,76 to the second drain conduits 78,80. The seal 22 is preferably in the inflated condition when the valve 70 is in the open condition. The seal 22 thereby substantially prevents fluid flowing from the second conduit 14 to the first conduit 12 from entering the space 22.

When the valve 70 is in the closed condition, the seal 20 is preferably in the inflated condition, and the first set of drain conduits 74,76 are aligned with the second set of drain conduits 78,80, thereby allowing fluid to flow out of the space 22, through the first drain conduits 74,76 and through the second drain conduits 78,80.

If cleaning of the valve 70 is desired, this may be achieved as follows. The seal 22 is deflated and the valve member 16 may be in either the open condition or the closed condition. Cleaning fluid is passed through the valve 70, from the first conduit 12 to the second conduit 14, or vice versa. The cleaning fluid flows through the passage 24 and the space 22. When the valve 70 is in the closed condition, thus opening the drain 72, some cleaning fluid will flow out of the space 22 through the drain 72. While cleaning fluid is flowing through the valve 70, the valve member 16 is flipped between the open and closed conditions, or vice versa as appropriate, and back again to ensure that cleaning fluid flows over the whole surface of the valve member 16. Any cleaning fluid ri g in the valve 70 after cleaning may be removed by rotating the valve 70 to the closed condition thereby opening the drain 72.

The embodiments described thus provide a valve which may be cleaned in situ using incline fluid flow, to achieve a high standard of hygiene. The embodiments described also provide a valve assembly for use in a pigging system, which enables a pig to be returned along a conduit, by supplying air into the conduit via the valve assembly. The valve assembly may be similarly cleaned to a high standard of hygiene.

Various modifications may be made without departing from the scope of the invention. For example, it will be appreciated that the valve may be used to connect any type of conduit in a wide range of manufacturing plant. The size of the valve is at least partly dependent upon the diameter of the conduits which are to be connected to the valve, The relative size of the valve member and housing, and the passage through the valve member, will be dependent upon the type of product passing through the valve apparatus.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon

What is claimed is:

1. A method of cleaning a valve having a housing; a valve member movably mounted in the housing, a space being defined between the valve member and the housing, the valve member being movable between an open condition in which fluid can flow through the valve and a closed condition in which fluid is substantially prevented from flowing through the valve; and releasable seal means operable to provide a seal between the valve member and the interior of the housing when the valve member is in the closed condition, the method comprising releasing the releasable seal means, moving the valve member to the open condition, and supplying fluid to the valve from one of first and second conduits connected to the valve, the fluid flowing through the valve member and the space to the other of the first and second conduits.

2. A method of cleaning a valve having a housing; a valve member movably mounted in the housing a space being defined between the valve member and the housing the valve member being movable between an open condition in which fluid can flow through the valve and a closed condition in which fluid is substantially prevented from flowing through the valve, and a pair of inflatable seal means located in an internal wall of the housing and around a passage in the valve member operable to provide a seal between the valve member and the interior of the housing when the valve member is in the closed condition, the method comprising moving the valve member to the closed condition, deflating at least one of the inflatable seal means and supplying fluid to the valve from one of first and second conduits connected to the valve, the fluid flowing through the space and the passage.

3. A method according to claim 2, in which both inflatable seal means are deflated.

4. A method according to claim 2 in which the method further comprises fipping the valve member from the closed condition to the open condition, and back again, while cleaning fluid is flowing through the valve, to assist the flow of cleaning fluid over substantially the whole surface of the valve member.

5. A method of cleaning a valve having a housing; a valve member movably mounted in the housing, a space being defined between the valve member and the housing, the valve member being movable between an open condition in which fluid can flow through the valve and a closed condition in which fluid is substantially prevented from flowing through the valve; releasable seal means operable to provide a seal between the valve member and the interior of the housing when the valve member is in the closed condition the housing defining a drain having open and closed conditions, the method comprising deflating each inflatable seal means and supplying fluid to the valve from one of first and second conduits connected to the valve, the fluid flowing through the space and a valve member passage.

6. A method according to claim 5 in which the valve member is in a selected one of the open condition and the closed condition.

7. A method according to claim 6 which the method further comprises flipping the valve member from one of the open condition and the closed condition to the other of the open condition and the closed condition, and back again, while cleaning fluid is flowing through the valve, to assist the flow of cleaning fluid over substantially the whole surface of the valve member.

8. A method of cleaning a valve comprising:
 a) shifting a valve seal from an operating position in sealing engagement with a valve member to a cleaning position wherein the seal is in spaced relationship with the valve member;
 b) while the seal member is in the cleaning position flowing a cleaning solution past the seal into a space between the valve member and a surrounding housing to clean the valve member and the space, and,
 c) thereafter returning the seal to its operating position.

9. The method of claim 8 further including the steps of draining the solution from the space by opening a drain passage in the housing.

10. The method of claim 9 wherein the shifting step is accomplished by deflating the seal and the return step is accomplished by inflating the seal.

11. The method of claim 10 wherein the inflation step is pneumatic.

12. The method of claim 9 wherein the drain passage is opened by shifting the valve member from a housing passage blocking position to a housing passage open position wherein a passage in a member pin is in communication of the housing passage.

13. The method of claim 9 wherein the draining step is accomplished with gravity induced flow.

14. The method of claim 8 wherein the valve is a ball valve.

15. The method of claim 14 wherein the inflation step is pneumatic.

16. The method of claim 8 wherein the shifting step is accomplished by deflating the seal and the return step is accomplished by inflation of the seal.

17. The method of claim 8 wherein a pig is forced through a conduit connected to the valve and through a flow passage in the valve member.

18. A method of urging a conduit cleaning device along a conduit connected to a valve assembly for use in a pigging system housing; a valve member movably mounted in the housing, a space being defined between the valve member and the housing, the valve member being movable between an open condition in which fluid can flow through the valve and a closed condition in which fluid is substantially prevented from flowing through the valve; releasable seal means operable to provide a seal between the valve member and the interior of the housing when the valve member is in the closed condition, the housing defining a drain having open and closed conditions, the method comprising moving the valve member to the closed condition, sealing the releasable seal means, and passing fluid to the space through the fluid inlet means, the fluid acting on a conduit cleaning device and thereby urging the device along the conduit.

19. A method according to claim 18 the passage defined by the valve member is communicatively connected to the space between the valve member and the housing when the valve is in the dosed condition.

20. A method according to claim 18 in which when the conduit cleaning device is located in one of the conduit and a second conduit the device is and adjacent the valve assembly, the valve member is in the closed condition and the seal means is located toward the other of the first and second conduits and is in the inflated condition, thereby sealing the valve assembly from the other conduit, fluid passed from the inlet means to the one conduit via the space and the passage acts on the conduit cleaning device, thereby urging the device along the one conduit.

* * * * *